United States Patent
Evoy

Patent Number: 5,758,173
Date of Patent: May 26, 1998

[54] DETECTION OF HAND LOCATION AS AN INPUT FOR POWER CONTROLS IN A COMPUTING SYSTEM

[75] Inventor: David Ross Evoy, Tempe, Ariz.

[73] Assignee: VLSI Technology, Inc., San Jose, Calif.

[21] Appl. No.: 611,259

[22] Filed: Mar. 5, 1996

[51] Int. Cl.$^6$ ............................................. G06F 1/00
[52] U.S. Cl. ............................................. 395/750.03
[58] Field of Search ........................... 395/750; 364/707

[56] References Cited

U.S. PATENT DOCUMENTS

| | | | |
|---|---|---|---|
| 5,319,250 | 6/1994 | Windsor | 307/139 |
| 5,380,983 | 1/1995 | Cavada et al. | 219/250 |
| 5,396,443 | 3/1995 | Mese et al. | 364/707 |
| 5,396,635 | 3/1995 | Fung | 395/800 |
| 5,449,984 | 9/1995 | Sawdon et al. | 315/386 |

Primary Examiner—Jack B. Harvey
Assistant Examiner—Jigar Pancholi
Attorney, Agent, or Firm—Douglas L. Weller

[57] ABSTRACT

Power is conserved in a computing system by detecting when a user's hands are not placed over a keyboard for the computing system. When it is detected that the user's hand are not placed over the keyboard power to a display for the computing system is reduced. For example, the hands are detected by generating and detecting ultrasound waves. In one embodiment of the present invention, the ultrasound waves are generated and detected from positions on a case of the computing system so that when the user's hands are placed on the keyboard, the user's hands block a portion of the ultrasound waves from being detected. In another embodiment, the ultrasound waves are generated and detected from positions on a case of the computing system so that when the user's hands are placed on the keyboard, the user's hands reflect a portion of the ultrasound waves so that the portion of the ultrasound waves are detected.

4 Claims, 9 Drawing Sheets

DETECTION OF HAND LOCATION AS AN INPUT FOR POWER CONTROLS IN A COMPUTING SYSTEM

BACKGROUND

This invention relates generally to power saving devices for computing systems and particularly to the use of detection circuitry which detects hand position of a user in order to provide input to power controls in a computing system.

In order to conserve battery power, many portable computers, such as notebook computers or laptop computers, include power saving features. Typically these power saving features include turning off various high power consuming elements of the portable computer. For example, many portable computers include timers which shut off a display and/or spin down a hard drive when a user of the computing has not used the keyboard and/or a trackpad/track ball/mouse for a predetermined period of time.

One problem with the power saving features described above is the lack of accuracy. If the timer is set for a long time, this can result in a significant amount of extra power being consumed when a portable computer is not in use. If the timer is set for a short period of time, it may shut down a portable computer when a user has merely paused to review recently entered work. It is desirable, therefore, to achieve a more accurate method to determine when a portable computer is in use and when it is appropriate to shut down power consuming elements of the portable computer.

SUMMARY OF THE INVENTION

In accordance with the preferred embodiment of the present invention power is conserved in a computing system by detecting when a user's hands are not placed over a keyboard for the computing system. When it is detected that the user's hand are not placed over the keyboard power to a display for the computing system is reduced. For example, the hands are detected by generating and detecting ultrasound waves.

In one embodiment of the present invention, the ultrasound waves are generated and detected from positions on a case of the computing system so that when the user's hands are placed on the keyboard, the user's hands block a portion of the ultrasound waves from being detected. In another embodiment, the ultrasound waves are generated and detected from positions on a case of the computing system so that when the user's hands are placed on the keyboard, the user's hands reflect a portion of the ultrasound waves so that the portion of the ultrasound waves are detected.

This use of ultrasound waves to detect the presence of a user's hands over the keyboard may be adapted to an existing sound system of a portable computer. For example, the ultrasound waves can be generated using two speakers and detected using a single microphone. Alternately, the ultrasound waves can be generated using a single speaker and detected using two microphones.

When generating the ultrasound waves, an ultrasound frequency signal can be summed with a normal audio output for the computing system to generate a summed signal. The summed signal is then amplified before being output by a speaker.

Similarly, the ultrasound waves may be received by a microphone along with other audio signals. The ultrasound component of the received audio signal is filtered. Peaks of the ultrasound component of the received audio signal are detected and compared with a predetermined amplitude level.

Once it is detected that the user's hands are removed from over the keyboard, power to the display may be immediately reduced. Alternately, once it is detected that the user's hands are removed from over the keyboard, the computing system can wait for a predetermined amount of time before reducing power to the display.

The present invention provides for an accurate and timely indication of whether a computer is in use. It is not necessary for a user who is pausing to review the contents of a display to continually strike a key or move a pointing device in order to prevent the display from turning off. On the other hand, it is possible to quickly detect when the user has stopped using a computer and thus to very efficiently limit power consumption.

DESCRIPTION OF THE PREFERRED EMBODIMENT

Figure 1:
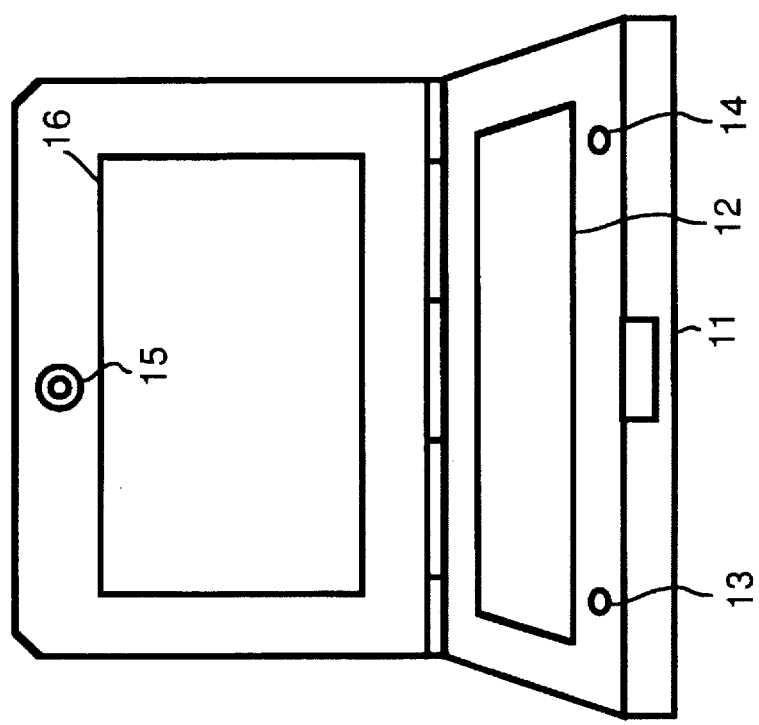
FIG. 1, FIG. 2 and FIG. 3 show various arrangements of microphone and speaker positions for a portable computer which utilizes ultrasound monitoring of hand position, in accordance with preferred embodiments of the present invention.

FIG. 1 shows a portable computer 11 with a keyboard 12. A microphone 13 and a microphone 14 are placed beside keyboard 12. A speaker 15 is placed over a display 16 of portable computer 11. Ultrasound waves generated by speaker 15 are received by microphones 13 and 14. When a user places his hands over keyboard 12, this interferes with the ultrasound transmission, muffling the signals received by microphones 13 and 14. By monitoring the strength of the ultrasound waves received by microphones 13 and 14, it is therefore possible to determine whether the user's hands are positioned over keyboard 12.

When the user's hands are positioned over keyboard 12, display 16 remains fully powered. When the user removes his hands from keyboard 12, display 16 is immediately turned off. Alternately, when the user removes his hands from keyboard 12, display 16 is turned off after a set period of time expires. The duration of the set period of time is set by the user.

In the preferred embodiment, speaker 15 is also used for normal audio output. The small size of speakers used in portable computers generally makes them efficient at high frequencies, even beyond normal audio range. In alternate embodiments, an ultrasonic transducer which is a separate component from the audio speaker may be used. This could be preferable in systems where the energy consumed by the audio speaker was excessive, where more than one transducer is required, or where physical placement of the ultrasound transducer and the audio speaker cannot be the same.

Figure 2:
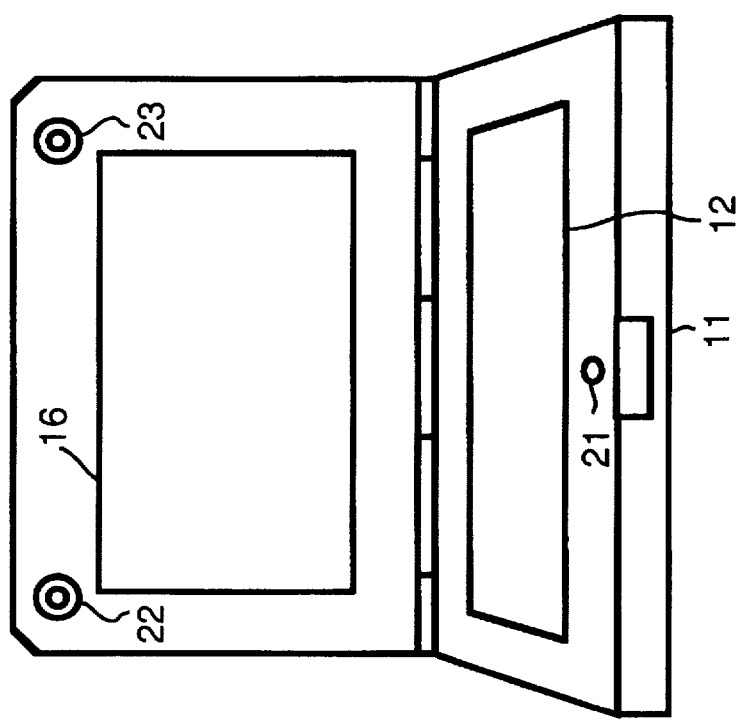

FIG. 2 shows portable computer 11 and keyboard 12 with an alternate microphone/speaker arrangement. A microphone 21 is placed beside keyboard 12, as shown. A speaker 22 and a speaker 23 are placed over display 16 as shown. The arrangement shown in FIG. 2 has the additional advantage of providing for stereo sound. Ultrasound waves generated by speakers 22 and 23 are received by microphone 21. When a user places his hands over keyboard 12, this interferes with the ultrasound transmission, muffling the signals received by microphone 21. By monitoring the strength of the ultrasound waves received by microphone 21, it is therefore possible to determine whether the user's hands are positioned over keyboard 12.

Figure 3:
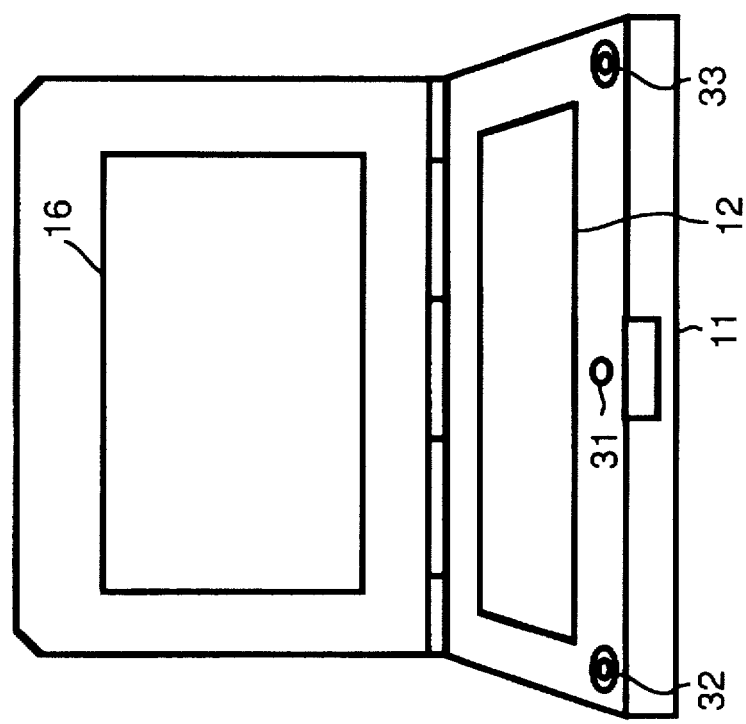

FIG. 3 shows portable computer 11 and keyboard 12 with another alternate microphone/speaker arrangement. A microphone 31 is placed beside keyboard 12, as shown. A speaker 32 and a speaker 33 are also placed beside keyboard 12, as shown. The arrangement shown in FIG. 3 relies on the reflection of an ultrasound transmission. Ultrasound waves generated by speakers 32 and 33 are detected by microphone 31. When a user places his hands over keyboard 12, this reflections a larger amount of the ultrasound transmission into microphone 31. By monitoring when the ultrasound waves received by microphone 31 increase in strength, it is possible to determine that the user's hands are positioned over keyboard 12.

Figure 4:
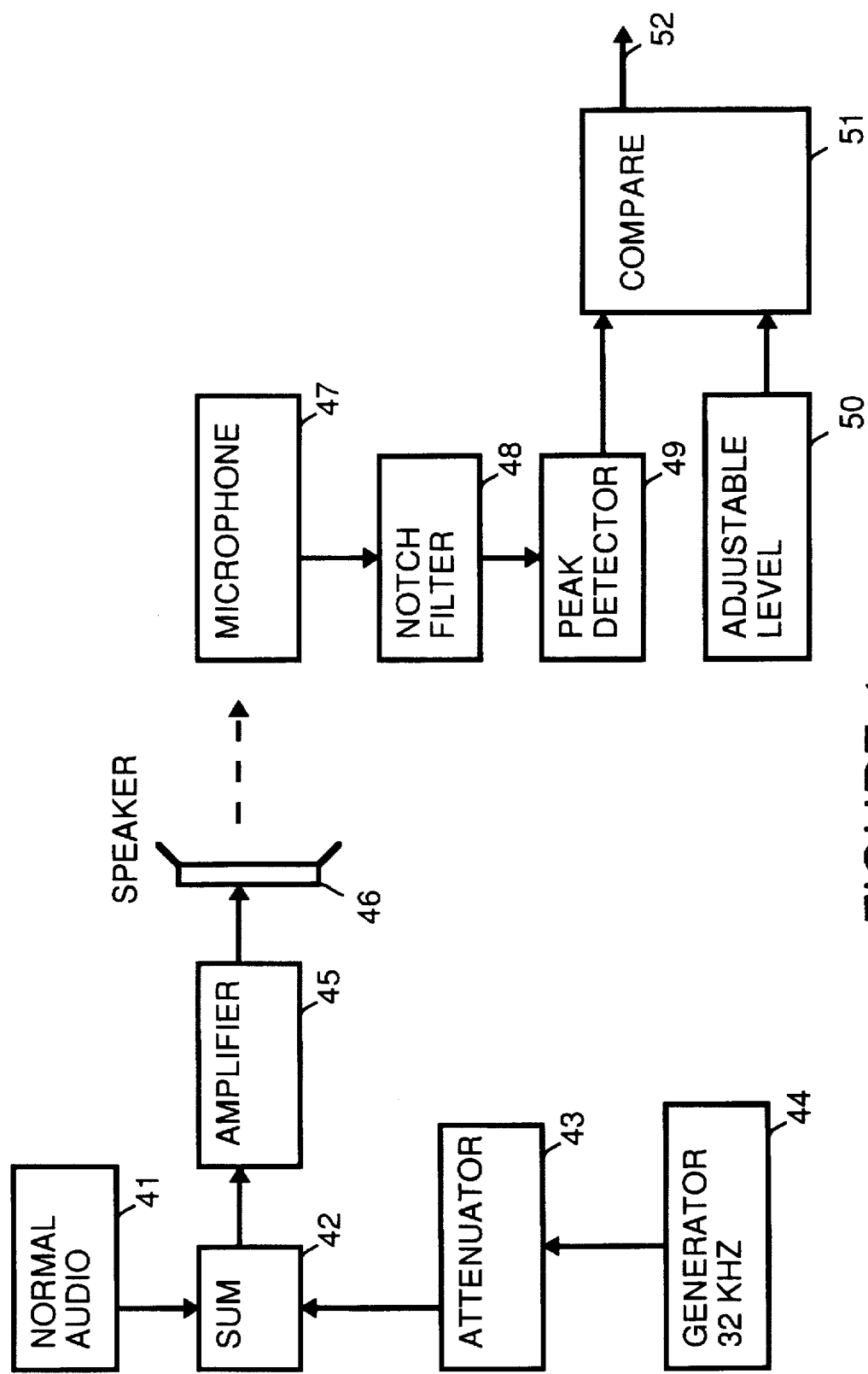
FIG. 4 is a block diagram of circuitry within a portable computer which monitors hand position in accordance with the preferred embodiment of the present invention.

FIG. 4 is a block diagram of circuitry within portable computer 11 which monitors hand position. A signal generator 44 generates a 32 kilohertz signal. In addition to being used for ultrasound transmissions, the 32 kilohertz signal generator 44 can be used by in accordance with the preferred embodiment of the present invention. Also, other signal frequencies (instead of 32 kilohertz) may be used to generate the ultrasound transmissions.

An attenuator circuit 43 attenuates the 32 kilohertz signal generated by signal generator 44. A sum circuit 42 sums the attenuated signal from attenuator circuit 43 with the normal audio output 41 of portable computer 11. The resulting signal is amplified by an amplifier circuit 45 and transmitted by a speaker 46. Speaker 46 may be variously positioned on personal computer 11 as described above.

A microphone 47 receives the transmission of ultrasound waves and normal audio from speaker 46. A notch filter 48 filters the received signals to pass the 32 kilohertz signal while blocking all other frequencies. A peak detector 49 detect the peak amplitude of the filtered signal. A comparison circuit 51 compares the peak amplitude with an adjustable level 50. An output 52 of comparison circuit 51 indicates when the detected peak is greater than adjusted level 50. Output 52 may be directly connected to a switch when controls power to display 16. Alternatively, output 52 may be used by a timing facility (e.g., a software routine) which controls power to display 16.

Figure 5:
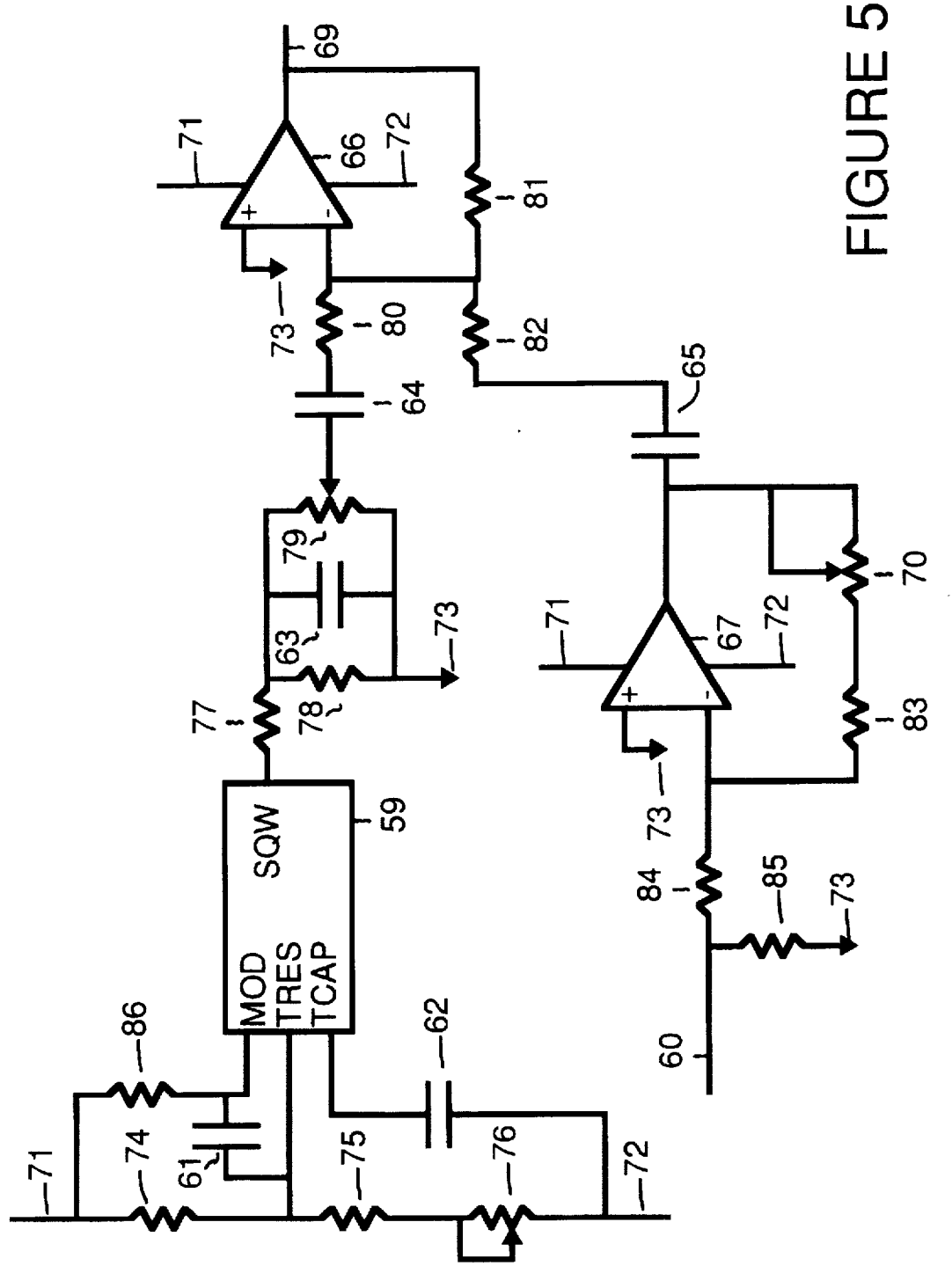
FIG. 5 shows a schematic of circuitry used to implement an ultrasound wave generator and attenuator in accordance with a preferred embodiment of the present invention.

FIG. 5 shows a schematic of circuitry used to implement generator 44, attenuator 43 and sum circuit 42. The circuitry includes a (LM566C or equivalent) square wave generator 59, an (LF347 or equivalent) operational (op amp) 66, an op amp 67, a capacitor 61, a capacitor 62, a capacitor 63, a capacitor 64, a capacitor 65, an adjustable resistance 70, an adjustable resistance 76, an adjustable resistance 79, a resistor 74, a resistor 75, a resistor 77, a resistor 78, a resistor 80, a resistor 81, a resistor 82, a resistor 83, a resistor 84, a resistor 85, a resistor 86, a positive voltage source 71, a negative voltage source 72 and a ground 73 connected as shown. A normal audio signal is received on an audio input 60. A summed signal is placed on an output line 69.

For example, positive voltage source 71 is at +5 volts. Negative voltage source is at −5 volts. Square wave generator is an LM666C part available from National Semiconductor Corporation having a business address of 1090 Kifer Road, Sunnyvale, Calif. 94086-3737. Capacitor 61 has a capacitance of 0.001 microfarads. Capacitor 62 has a capacitance of 0.002 microfarads. Capacitor 63 has a capacitance of 0.001 microfarads. Capacitor 64 has a capacitance of 0.001 microfarads. Capacitor 65 has a capacitance of 1 microfarad.

Resistor 74 has a resistance of 1.5 kilohms. Resistor 75 has a resistance of 9.5 kilohms. Resistor 77 has a resistance of 10 kilohms. Resistor 78 has a resistance of 1 kilohms. Resistor 80 has a resistance of 10 kilohms. Resistor 81 has a resistance of 10 kilohms. Resistor 82 has a resistance of 10 kilohms. Resistor 83 has a resistance of 1 kilohms. Resistor 84 has a resistance of 1 kilohms. Resistor 85 has a resistance of 75 ohms. Resistor 86 has a resistance of 4.7 kilohms.

Adjustable resistor 79 is used to adjust the amount of the 32 kilohertz signal that is added to the audio output. Resistor 85 is used to match the impedance of the audio input 60.

Figure 6:
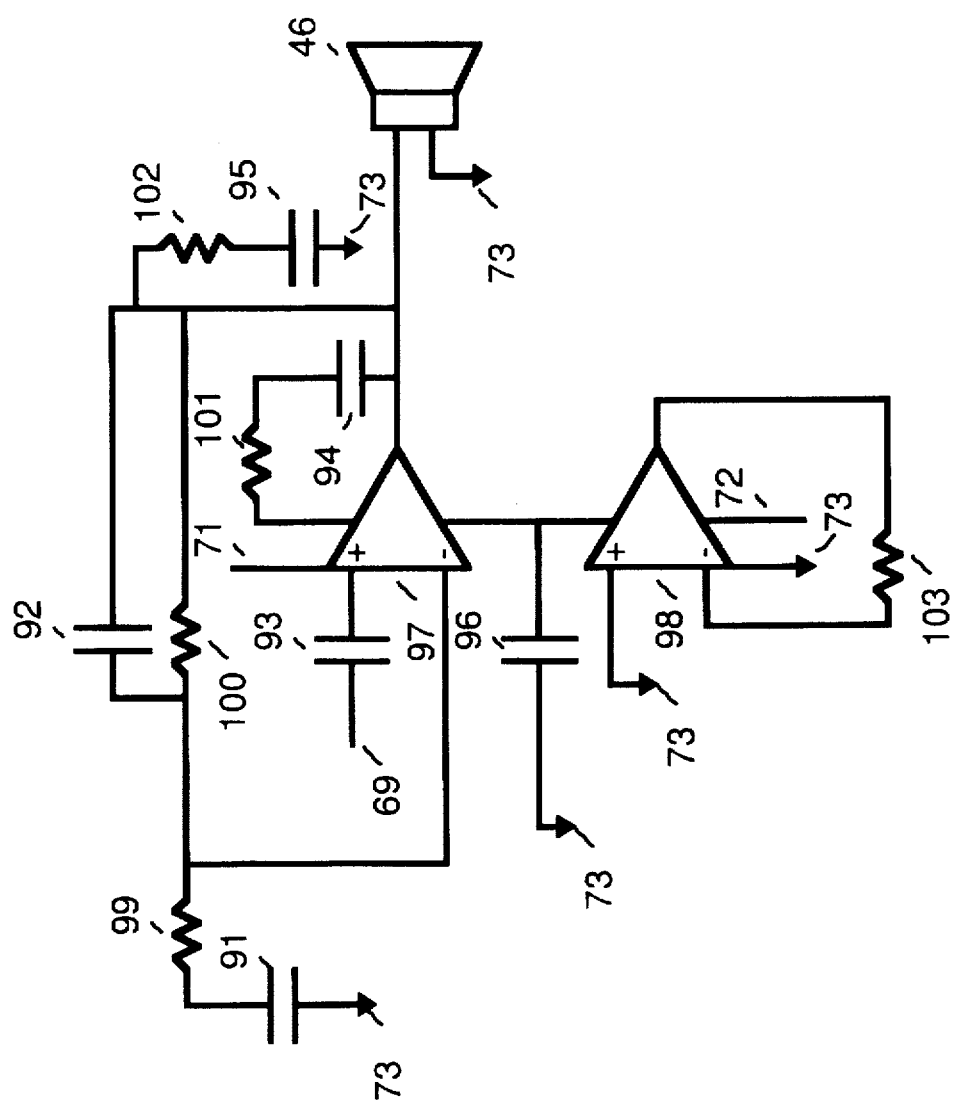
FIG. 6 shows a schematic of circuitry used to implement an amplifier system for a speaker in accordance with a preferred embodiment of the present invention.

FIG. 6 shows a schematic of circuitry used to implement amplifier 45. The circuitry includes an operational amplifier 97, a capacitor 91, a capacitor 92, a capacitor 93, a capacitor 94, a capacitor 95, a capacitor 96, a resistor 99, a resistor 100, resistor 101, resistor 102, positive voltage source 71, negative voltage source 72 and ground 73 connected as shown. The circuitry receives the summed signal on line 69 provides a signal for speaker 46.

For example, capacitor 91 has a capacitance of 10 microfarads. Capacitor 92 has a capacitance of 50 picofarads. Capacitor 93 has a capacitance of 0.1 microfarads. Capacitor 94 has a capacitance of 150 microfarads. Capacitor 95 has a capacitance of 0.1 microfarads. Capacitor 96 has a capacitance of 100 microfarads.

An operational amplifier 98 and a resistor 103 are present in the circuitry and can be used for another channel of audio, if desired. For example, resistor 103 has a resistance of 10 kilohms.

Figure 7:
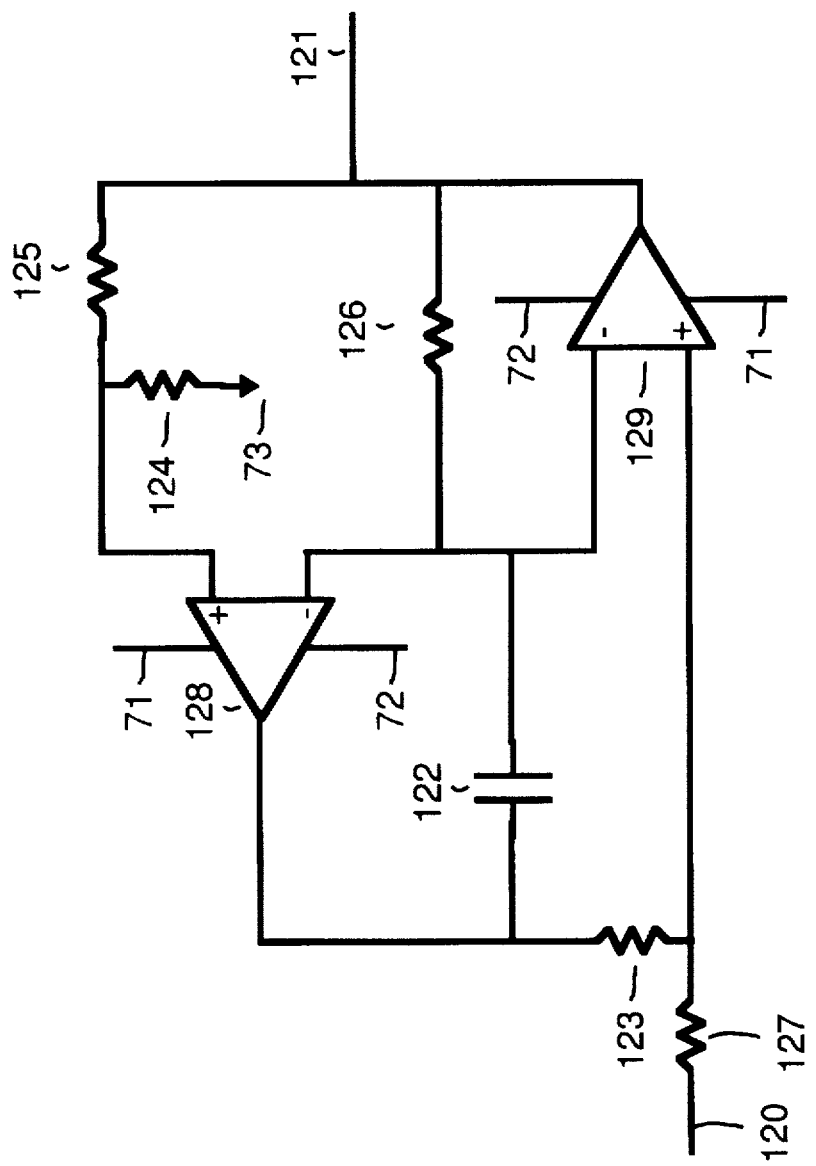
FIG. 7 shows a schematic of circuitry used to implement a notch filter in accordance with a preferred embodiment of the present invention.

FIG. 7 shows a schematic of circuitry used to implement notch filter 48. Notch filter 48 receives from microphone circuitry a signal which has already been picked up and amplified. The normal audio would be split off before notch filter 48 using, for example, low and high pass filters. Notch filter is used to pass the 32 kilohertz signal.

The circuitry includes an op amp 128, an op amp 129, a capacitor 122, a resistor 123, a resistor 124, a resistor 125, a resistor 126, a resistor 127, positive voltage source 71, negative voltage source 72 and ground 73 connected as shown. The circuitry receives an amplified and filtered signal from microphone 47 on an input line 120. The circuitry generates a notched filtered signal on line 121.

For example, capacitor 122 has a capacitance of 0.001 microfarads. Resistor 123 has a resistance of 5 kilohms. Resistor 124 has a resistance of 10 kilohms. Resistor 125 has a resistance of 10 kilohms. Resistor 126 has a resistance of 5 kilohms. Resistor 127 has a resistance of 220 kilohms.

The Q of the notch filter 48 is 40, and is so high that the center must be well controlled. Resistor 123 can be made adjustable to tune the frequency. Resistor 127 can be made adjustable to tune the Q.

Figure 8:
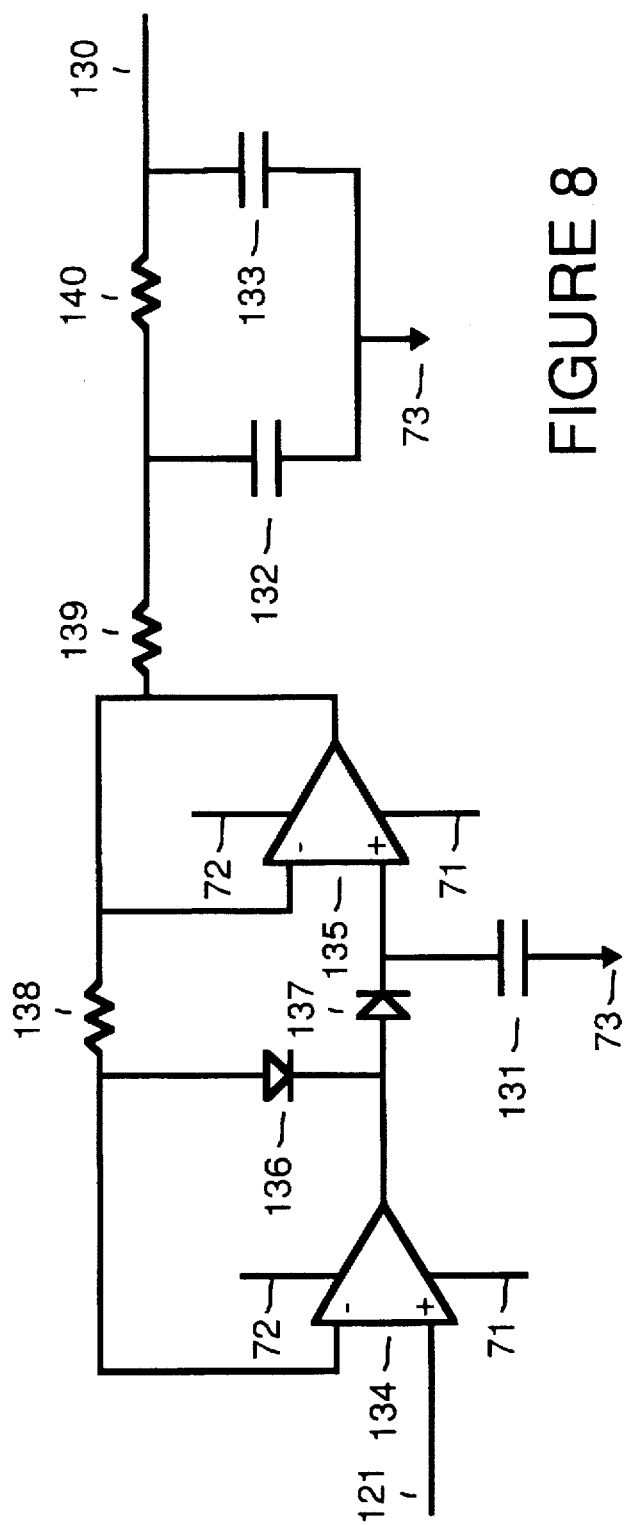
FIG. 8 shows a schematic of circuitry used to implement a peak detector in accordance with a preferred embodiment of the present invention.

FIG. 8 shows a schematic of circuitry used to implement peak detector 49. Peak detector 49 receives from notch filter 48 a notched filtered signal on line 121 and generates a peak level on a line 130.

The circuitry includes an op amp 134, an op amp 135, a capacitor 131, a capacitor 132, a capacitor 133, a resistor 138, a resistor 139, a resistor 140, a diode 136, a diode 137, positive voltage source 71, negative voltage source 72 and ground 73 connected as shown.

For example, capacitor 131 has a capacitance of 1000 picofarads. Capacitor 132 has a capacitance of 0.1 microfarads. Capacitor 133 has a capacitance of 0.01 microfarads. Resistor 138 has a resistance of 10 kilohms. Resistor 139 has a resistance of 10 kilohms. Resistor 140 has a resistance of 100 kilohms.

Resistor 139, resistor 140, capacitor 132 and capacitor 133 filter out any noise on the ultrasound level signal.

Figure 9:
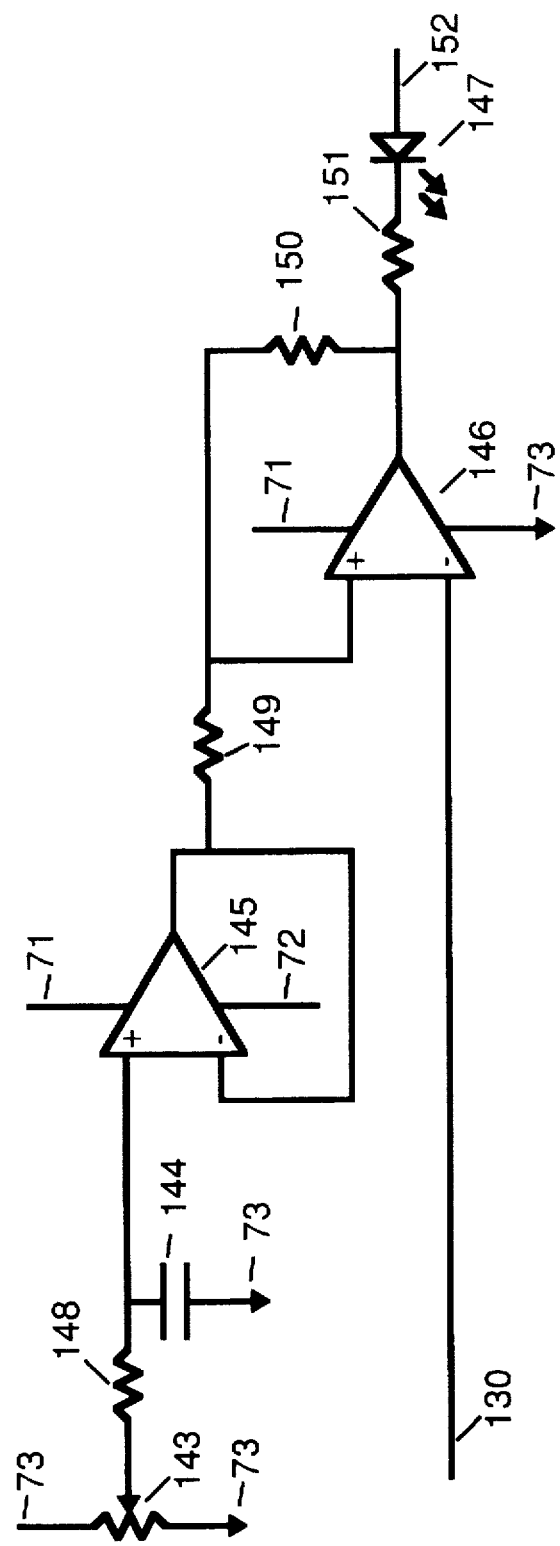
FIG. 9 shows a schematic of circuitry used to implement a comparison in accordance with a preferred embodiment of the present invention.

FIG. 9 shows a schematic of circuitry used to implement compare circuit 51 and adjustable level 50. Compare circuit 51 receives from peak detector 49 a peak level on line 130.

The circuitry includes an op amp 145, an op amp 146, a capacitor 144, an adjustable resistor 143, a resistor 148, a resistor 149, a resistor 150, a resistor 151, positive voltage source 71, negative voltage source 72 and ground 73 connected as shown.

For example, capacitor 144 has a capacitance of 0.1 microfarads. Resistor 148 has a resistance of 10 kilohms. Resistor 149 has a resistance of 10 kilohms. Resistor 150 has a resistance of 220 kilohms. Resistor 151 has a resistance of 150 kilohms.

The circuitry compares the peak level on line 130 to the adjusted level controlled by adjustable resistor 143 to determine if a users hands over keyboard 12. The peak level on line 130 is a positive signal that increases with increased amounts of the amplitude of the 32 KHz signal detected.

Display 16 is represented by an LED 147 connected to a five volt power source 152. If the peak level on line 130 is less than the adjusted level, then the output of op amp 146 will be positive and LED 147 will be turned off. This is appropriate for applications where reflection of the ultrasound waves is used to detect hands are placed over keyboard 12.

The output of op amp 146 may also be used to start a timer to turn off display 16 when the hands of the user have been removed from keyboard 12 a predetermined length of time. For applications where reflection of the ultrasound waves is used to detect hands are placed over keyboard 12, a transition on the output of op amp 146 from low to high will start the timer. For applications where blocking of the ultrasound waves is used to detect hands are placed over keyboard 12, a transition on the output of op amp 146 from high to low will start the timer.

In one embodiment of the present invention, backlighting of display 16 is controlled by software running on portable computer 11. In this case, output 52 is used to generate an interrupt to the software to indicate that a change has occurred. The software then controls the backlighting.

Adjustable resistor 143, resistor 148 and capacitor 144 create a threshold. Op amp 145 is a voltage follower that isolates the threshold components from resistor 150, a hysteresis generation component, so that the amount of hysteresis does not changes as the impedance of adjustable resistor 143 is changed to adjust the threshold.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computing system comprising:

a case;

a display, coupled to the case;

a keyboard, coupled to the case;

a detector, coupled to the case, for detecting when a user's hands are placed over the keyboard, the detector comprising:

a generator of ultrasound waves, and an ultrasound wave detector of the ultrasound waves generated by the generator, the ultrasound wave detector including:

a microphone for receiving a received audio signal, a notch filter for filtering an ultrasound component of the received audio signal, a peak detector for detecting peaks of the ultrasound component of the received audio signal, and a compare circuit for comparing the detected peaks of the ultrasound component of the received audio signal with a predetermined amplitude level; and, a power reducing means, coupled to the detector, for reducing power to the display when the detector detects that the user's hand are not placed over the keyboard.

2. A computing system comprising:

a case;

a display, coupled to the case;

a keyboard, coupled to the case;

a detector, coupled to the case, for detecting when a user's hands are placed over the keyboard, the detector comprising:

a generator of ultrasound waves, the generator including:

a speaker, a signal generator for generating an ultrasound frequency signal, a sum circuit, coupled to the signal generator, which sums the ultrasound frequency signal with a normal audio output for the computing system to generate a summed signal, and an amplifier, coupled to the sum circuit and the speaker, for receiving the summed signal and generating output signals output by the speaker, and an ultrasound wave detector of the ultrasound waves generated by the generator; and, a power reducing means, coupled to the detector, for reducing power to the display when the detector detects that the user's hand are not placed over the keyboard.

3. A method for conserving power in a computing system comprising the steps of:

(a) detecting when a user's hands are not placed over a keyboard for the computing system, including following substeps:

(a.1) generating ultrasound waves, including the following substeps:

generating an ultrasound frequency signal, summing the ultrasound frequency signal with a normal audio output for the computing system to generate a summed signal, and amplifying the summed signal to generate output signals for output by a speaker, and, (a.2) detecting the ultrasound waves generated in substep (a.1); and, (b) reducing power to a display for the computing system when in step (a) it is detected that the user's hand are not placed over the keyboard.

4. A method for conserving power in a computing system comprising the steps of:

(a) detecting when a user's hands are not placed over a keyboard for the computing system, including following substeps:

(a.1) generating ultrasound waves, and, (a.2) detecting the ultrasound waves geerated in substep (a.1), including the following substeps:

receiving a received audio signal via a microphone, filtering an ultrasound component of the received audio signal, detecting peaks of the ultrasound component of the received audio signal, and comparing the detected peaks of the ultrasound component of the received audio signal with a predetermined amplitude level; and, (b) reducing power to a display for the computing system when in step (a) it is detected that the user's hand are not placed over the keyboard.

* * * * *